(12) United States Patent
Walter et al.

(10) Patent No.: US 8,758,549 B2
(45) Date of Patent: Jun. 24, 2014

(54) ONE COMPONENT EPOXY RESIN COMPOSITION

(71) Applicant: Henkel AG & Co. KGaA, Duesseldorf (DE)

(72) Inventors: Pablo Walter, Duesseldorf (DE); Mustapha Benomar, Duisburg (DE); Stefan Kreiling, Duesseldorf (DE); Angelika Troll, Duesseldorf (DE); Rainer Schoenfeld, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/668,646

(22) Filed: Nov. 5, 2012

(65) Prior Publication Data

US 2013/0056151 A1     Mar. 7, 2013

Related U.S. Application Data

(63) Continuation of application No. PCT/EP2011/056906, filed on May 2, 2011.

(30) Foreign Application Priority Data

May 5, 2010   (DE) .......................... 10 2010 028 586

(51) Int. Cl.
  *C09J 163/04*   (2006.01)
  *C09J 163/00*   (2006.01)
  *C08L 63/00*    (2006.01)
  *C08L 63/04*    (2006.01)
  *C08G 59/38*    (2006.01)
  *C08G 59/40*    (2006.01)

(52) U.S. Cl.
  USPC ........... 156/330; 523/427; 523/428; 525/524; 521/135; 521/178

(58) Field of Classification Search
  None
  See application file for complete search history.

(56) References Cited

U.S. PATENT DOCUMENTS

| | | | | |
|---|---|---|---|---|
| 3,267,172 | A | * | 8/1966 | Arnold .......................... 220/678 |
| 3,294,748 | A | * | 12/1966 | Rogers et al. ................. 528/120 |
| 3,315,035 | A | * | 4/1967 | Applegath et al. ............ 348/824 |
| 3,630,997 | A | | 12/1971 | Craven |
| 3,945,996 | A | | 3/1976 | Conrad et al. |
| 4,410,457 | A | * | 10/1983 | Fujimura et al. .............. 252/508 |
| 4,990,679 | A | | 2/1991 | Wolf et al. |
| 5,420,952 | A | | 5/1995 | Katsura et al. |
| 6,060,539 | A | * | 5/2000 | Hermansen et al. .......... 523/400 |
| 6,207,733 | B1 | | 3/2001 | Feola et al. |
| 6,348,513 | B1 | * | 2/2002 | Hilborn et al. .................. 521/95 |
| 2005/0249491 | A1 | | 11/2005 | Lu et al. |
| 2007/0123664 | A1 | | 5/2007 | Abrami et al. |

FOREIGN PATENT DOCUMENTS

| | | |
|---|---|---|
| DE | 19729875 A1 | 1/1998 |
| EP | 2006310 | 12/2008 |
| JP | 2204506 | 8/1990 |
| WO | 9929757 A1 | 6/1999 |
| WO | 2005028542 A2 | 3/2005 |
| WO | 2007060091 A1 | 5/2007 |

OTHER PUBLICATIONS

Dow Plastics: "Dow Epoxy Novolac Resins" (1998).*

* cited by examiner

*Primary Examiner* — Michael J Feely
(74) *Attorney, Agent, or Firm* — Steven C. Bauman

(57) ABSTRACT

The present invention relates to heat-curable compositions containing a mixture of reactive epoxy resins that contains, based on the mass of all epoxy resins, a) at least 10 wt % of an epoxy group-containing reaction product of epichlorohydrin with polypropylene glycol which has an epoxy equivalent weight of at least 250 g/eq, and b) at least 10 wt % of an epoxy group-containing reaction product of epichlorohydrin with a novolac resin which has an epoxy equivalent weight of at least 175 g/eq, and at least one latent hardener.

10 Claims, No Drawings

ONE COMPONENT EPOXY RESIN COMPOSITION

BACKGROUND OF THE INVENTION

The present invention relates to a one-component adhesive based on a special epoxy resin system. The epoxy resin system according to the present invention makes it possible to furnish, without the use of components that are classified as toxic, irritating, or sensitizing and that would necessitate corresponding labeling according to European law, adhesives that are equivalent to conventional adhesive systems in terms of most utilization properties.

Epoxy-based resin systems have been successfully used for some time as adhesives or repair compounds for consumers, hobbyists, and craftsmen, and in the aviation, automotive, or electrical industry as adhesives, sealants, and for coating surfaces, or utilized as resin systems with a number of different materials for the manufacture of composite materials. Hardenable formulations that contain epoxy/hardener mixtures are particularly suitable as structural adhesives.

Epoxy-based resin systems are furthermore suitable as so-called structural foams for filling and reinforcing hollow components, in particular in automobile construction. Lightweight components for dimensionally consistent series production with high stiffness and structural strength are necessary for many areas of application. In vehicle construction in particular, because of the desire for weight saving, there is a great demand for lightweight components made of thin-walled structures that nevertheless possess sufficient stiffness and structural strength. One approach to achieving high stiffness and structural strength with the lowest possible component weight utilizes hollow parts that are produced from relatively thin sheet metal or plastic panels. Thin-walled metal sheets tend to deform easily, however. It has therefore been known for some time to foam out this cavity in hollow-body structures with a structural foam, which on the one hand prevents or minimizes deformation, and on the other hand enhances the strength and stiffness of these parts.

Foamed reinforcing and stiffening agents of this kind usually either are metal foams, or contain a thermally hardenable resin or binder such as, for example, epoxy resins. These compositions as a rule contain a blowing agent, fillers, and reinforcing fillers such as, for example, hollow microspheres made of glass. Such foams preferably have, in the foamed and cured state, a density from 0.3 to 0.7 g/cm$^3$. After curing, these foams are said to withstand temperatures of more than 130° C., preferably more than 150° C., at least for a short time, without damage. Foamable, thermally hardenable compositions of this kind generally contain further constituents such as hardening agents, process adjuvants, stabilizers, dyes or pigments, optionally UV absorbers and adhesion-intensifying constituents.

One important property of the uncured resin system is its viscosity, which is significant in terms of handling and processability. Important material properties of the hardened formulations are, among others, adhesive power (often determined as tensile shear strength) and modulus of elasticity.

Reactive epoxy resin systems of the existing art often contain constituents that are classified as hazardous to water, toxic, irritating, and/or sensitizing and can result, for example, in contact dermatitis upon processing. According to European law, such preparations must be labeled with the corresponding hazard identifiers (e.g.: C, Xn, Xi, N). Preparations that contain reactive epoxy resins, and that do not require labeling under European law and exhibit reduced sensitizing potential, but that meet technical requirements in terms of processability and adhesive properties, are desirable for reasons of environmental protection, safety, and industrial hygiene.

It is known that reactive epoxy resins having a molar mass above 700 g/mol are not sensitizing and do not require labeling. Examples thereof are high-molecular-weight solids based on diglycidyl ethers of bisphenol A (DGEBA), and liquid epoxy-terminated polyethers having a high epoxy equivalent weight. These in some cases do not, however, exhibit the required viscosity properties for processing prior to curing, and/or the necessary strength properties after curing. High-molecular-weight solid epoxy novolacs have the high epoxy functionality (and correspondingly low epoxy equivalent weight) necessary for high strength, but because of their high viscosity at room temperature are not processable.

SUMMARY OF THE INVENTION

The object of the present invention was therefore to develop a hardenable one-component epoxy resin mixture that is advantageous from a toxicological and dermatological standpoint and nevertheless has no disadvantages in terms of utilization properties, in particular viscosity during processing and/or strength after curing.

It has now been found, surprisingly, that suitable mixtures of different reactive epoxy resins result in the desired combination of properties (freedom from labeling requirement, processability, and adhesive properties).

DETAILED DESCRIPTION OF THE INVENTION

A first subject of the present invention is therefore a composition, curable by the application of heat,
containing a mixture of reactive epoxy resins that contains, based on the mass of all epoxy resins,
  a) at least 10 wt % of an epoxy group-containing reaction product of epichlorohydrin with polypropylene glycol which has an epoxy equivalent weight of at least 250 g/eq, and
  b) at least 10 wt % of an epoxy group-containing reaction product of epichlorohydrin with a novolac resin which has an epoxy equivalent weight of at least 175 g/eq,
and at least one latent hardener.

According to the present invention, a "reactive epoxy resin" is understood as a prepolymer that has an average epoxy functionality greater than 1. As a result of the reactive epoxy groups, the prepolymer can be reacted with further molecules (called "hardeners") that are reactive with respect to epoxy groups, and can thereby be "cured" or "hardened."

As a first component a) essential to the invention, the composition according to the present invention contains at least 10 wt % of an epoxy group-containing reaction product of epichlorohydrin with polypropylene glycol which has an epoxy equivalent weight of at least 250 g/eq.

In a preferred embodiment, the composition according to the present invention contains 10 to 60 wt % of component a). A quantity range from 25 to 45 wt % is especially preferred. The quantity indications refer in each case to the mixture of all reactive epoxy resins without the further formulation constituents.

In the context of the work on which this invention is based, it was possible to show that epoxy group-containing reaction products of epichlorohydrin with polypropylene glycol having an epoxy equivalent weight of at least 300 g/eq exhibit particularly advantageous properties.

Particularly preferred components a) are, according to the present invention, the reactive epoxy resins marketed under the commercial designations DER 372 (EEW 310 to 330 g/eq), DER 732P (EEW 310 to 330 g/eq) by the Dow company.

It is particularly advantageous according to the present invention if corresponding epoxy group-containing reaction products of epichlorohydrin with polypropylene glycol having an epoxy equivalent weight of less than 300 g/eq are contained at a proportion of at most 3 wt %, in particular at most 1 wt %, based in each case on the total composition.

As a second component b) essential to the invention, the composition according to the present invention contains at least 10 wt % of an epoxy group-containing reaction product of epichlorohydrin with a novolac resin which has an epoxy equivalent weight of at least 175 g/eq.

In a preferred embodiment, the composition according to the present invention contains 10 to 85 wt % of component b). A quantity range from 30 to 45 wt % is especially preferred. The quantity indications refer in each case to the mixture of all epoxy resins, without the further formulation constituents.

In the context of the work on which this invention is based, it was possible to show that epoxy group-containing reaction products of epichlorohydrin with a novolac having an epoxy equivalent weight of at least 180 g/eq, and in particular of at least 190 g/eq, exhibit particularly advantageous properties.

Novolacs preferred according to the present invention are the polycondensation products of formaldehyde with phenol and/or cresol.

It has furthermore proven to be advantageous if the reaction products of epichlorohydrin and novolac have an epoxy functionality of at least 3, in particular of at least 3.5.

Reaction products of epichlorohydrin and novolac which have an epoxy equivalent weight of at least 175 g/eq and simultaneously an epoxy functionality of at least 3 were found to be particularly convincing in terms of the objects stated according to the present invention. Reaction products of epichlorohydrin and novolac having an epoxy equivalent weight of at least 180 g/eq and an epoxy functionality of at least 3, in particular reaction products of epichlorohydrin and novolac having an epoxy equivalent weight of at least 190 g/eq and an epoxy functionality of at least 3.5, are particularly preferred.

The desired property combination of processability prior to curing, and adhesion strength after curing, are most effectively achieved thereby.

Particularly preferred components b) are, according to the present invention, the reactive epoxy resins marketed under the commercial designations DEN 439 (EEW 191 to 210 gleq, functionality 3.8; Dow), Araldite ECN 1299 (cresol-formaldehyde novolac, EEW 235 g/eq, functionality 2.5 to 5.5; Huntsman), Epikote 154 (EEW 176 to 181 g/eq; Hexion). DEN 439 is very particularly preferred according to the present invention.

It is particularly advantageous according to the present invention if corresponding reaction products of epichlorohydrin and novolac having an epoxy equivalent weight of less than 175 g/eq are contained at a proportion of at most 3 wt %, in particular at most 1 wt %, based in each case on the total composition.

In order to ensure optimum processability of the compositions according to the present invention, it has proven particularly advantageous according to the present invention if the epoxy-containing compositions have viscosities below 3000 Pas. Preparations having a viscosity below 500 PaS are very particularly preferred. Viscosity measurements are accomplished according to the present invention at 25° C. using a rheometer and the following viscosity-dependent settings:

at a viscosity <0.25 Pa*s, measurement was performed using a cone and plate (0.04°/25 mm) at a shear rate of 0 to 100/s;

viscosities >0.25 Pa*s and <10,000 Pa*s were measured using parallel plates (25 mm/25 mm) at a shear rate of 0 to 100/s; and viscosities >10,000 Pa*s were measured using parallel plates (25 mm/25 mm) and at an angular frequency of 100 rad/s.

According to the present invention, a measurement at a "shear rate of 0 to 100/s" is understood as a measurement in which the shear speed is increased, within 100 s, from 0/s to 100/s. The shear speed is then held constant for 30 s, and then the result is determined.

A further essential property of the agents according to the present invention is the so-called tensile shear strength. This is determined by means of the following experimental setup:

Two sandblasted, cold-rolled steel specimens are wetted with the adhesive to be tested on an overlap area of 2.5 cm$^2$, and bonded; the layer thickness of the applied adhesive is 0.2 mm. After corresponding curing, the tensile shear strength of the adhesive is tested in accordance with DIN EN 1465 at a rate of 15 mm/min.

It has proven to be advantageous according to the present invention if the adhesives exhibit, after they have cured, a tensile shear strength above 8 MPa, in particular above 10 MPa. The speed of the curing process plays no essential role in this context.

In a preferred embodiment of the present invention, the epoxy resin mixture further contains at least 10 wt % of an epoxy group-containing reaction product of epichlorohydrin with bisphenol A which has an epoxy equivalent weight of at least 500 g/eq.

In this embodiment, compositions that contain, based on the mass of all epoxy resins, the following components:

a) 10 to 60 wt % of an epoxy group-containing reaction product of epichlorohydrin with polypropylene glycol which has an epoxy equivalent weight of at least 250 g/eq, b) 15 to 85 wt % of an epoxy group-containing reaction product of epichlorohydrin with a novolac resin which has an epoxy equivalent weight of at least 175 g/eq, and c) 0 to 70 wt % of an epoxy group-containing reaction product of epichlorohydrin with at least one bisphenol which has an epoxy equivalent weight of at least 500 g/eq, are accordingly particularly preferred.

In this embodiment, compositions that contain, based on the mass of all epoxy resins, the following components:

a) 10 to 60 wt % of an epoxy group-containing reaction product of epichlorohydrin with polypropylene glycol which has an epoxy equivalent weight of at least 250 g/eq, b) 15 to 85 wt % of an epoxy group-containing reaction product of epichlorohydrin with a novolac resin which has an epoxy equivalent weight of at least 175 g/eq and has an epoxy functionality of at least 3, and c) 0 to 70 wt % of an epoxy group-containing reaction product of epichlorohydrin with at least one bisphenol which has an epoxy equivalent weight of at least 500 g/eq, are accordingly very particularly preferred according to the present invention.

Compositions that contain, based on the mass of all epoxy resins, the following components:

a) 30 to 45 wt % of an epoxy group-containing reaction product of epichlorohydrin with polypropylene glycol which has an epoxy equivalent weight of at least 250 g/eq,
b) 30 to 45 wt % of an epoxy group-containing reaction product of epichlorohydrin with a novolac resin which has an epoxy equivalent weight of at least 175 g/eq, and
c) 10 to 40 wt % of an epoxy group-containing reaction product of epichlorohydrin with at least one bisphenol which has an epoxy equivalent weight of at least 500 g/eq, are particularly preferred according to the present invention.

It has proven to be particularly advantageous according to the present invention if the composition according to the present invention contains 0 to 70 wt % of an epoxy group-containing reaction product of epichlorohydrin with bisphenol A which has an epoxy equivalent weight of at least 500 g/eq. A quantity range from 10 to 40 wt % is especially preferred. The quantity indications refer in each case to the mixture of all epoxy resins, without the further formulation constituents.

In the context of the work on which this invention is based, it was possible to show that epoxy group-containing reaction products of epichlorohydrin with bisphenol A having an epoxy equivalent weight of at least 560 g/eq exhibit particularly advantageous properties.

Epoxy group-containing reaction products of epichlorohydrin with bisphenol A which have an epoxy equivalent weight of at least 500 g/eq that are particularly preferred according to the present invention are the epoxy resins marketed under the commercial designations:

Epikote® 1002 (EEW 575 to 700 g/eq; epoxy functionality 2; Hexion),
DER® 662E (EEW 590 to 630 g/eq; epoxy functionality 2),
Epon® 1002F (EEW 600 to 700 g/eq; epoxy functionality 2),
DER® 662UH (EEW 675 to 750 g/eq; epoxy functionality 2),
DER® 663U (EEW 730 to 820 g/eq; epoxy functionality 2),
DER® 664U (EEW 875 to 955 g/eq; epoxy functionality 2),
Epon® 1009F (EEW 2300 to 3800 g/eq; epoxy functionality 2; Hexion),
Epon® 1007F (EEW 1700 to 2300 g/eq; epoxy functionality 2; Hexion),
Epon® 1004F (EEW 800 to 950 g/eq; epoxy functionality 2; Hexion),
DER® 692H (EEW 660 to 720 g/eq; epoxy functionality 2; Dow),
DER® 692 (EEW 660 to 720 g/eq; epoxy functionality 2; Dow).

The products marketed under the commercial designations Epikote® 1002, DER® 662E, and Epon® 1002F are very particularly preferred according to the present invention. Epon® 1002F is very particularly preferred according to the present invention.

It is particularly advantageous according to the present invention if corresponding epoxy group-containing reaction products of epichlorohydrin with bisphenol A which have an epoxy equivalent weight below 500 g/eq are contained at a proportion of at most 3 wt %, in particular at a proportion of at most 1 wt % in each case on the total composition.

Especially in toxicological terms, it has proven to be advantageous if the compositions according to the present invention contain, besides the aforesaid epoxy group-containing reaction products a), b), and c) that are essential to the invention, less than 3 wt %, in particular less than 1 wt %, of further epoxy group-containing reaction products, based in each case on the total preparation.

In a particularly preferred embodiment of this subject, the mixture of the epoxy resins is made up of
a) 10 to 60 wt % of an epoxy group-containing reaction product of epichlorohydrin with polypropylene glycol which has an epoxy equivalent weight of at least 250 g/eq,
b) 15 to 85 wt % of an epoxy group-containing reaction product of epichlorohydrin with a novolac resin which has an epoxy equivalent weight of at least 175 g/eq, and
c) 0 to 70 wt % of an epoxy group-containing reaction product of epichlorohydrin with at least one bisphenol which has an epoxy equivalent weight of at least 500 g/eq, the quantities of constituents a), b), and c) adding up to 100 wt %.

In a very particularly preferred embodiment of this subject, the mixture of the epoxy resins is made up of
a) 10 to 60 wt % of an epoxy group-containing reaction product of epichlorohydrin with polypropylene glycol which has an epoxy equivalent weight of at least 250 g/eq,
b) 15 to 85 wt % of an epoxy group-containing reaction product of epichlorohydrin with a novolac resin which has an epoxy equivalent weight of at least 175 g/eq and an epoxy functionality of at least 3, and
c) 0 to 70 wt % of an epoxy group-containing reaction product of epichlorohydrin with at least one bisphenol which has an epoxy equivalent weight of at least 500 g/eq, the quantities of constituents a), b), and c) adding up to 100 wt %.

In a very particularly preferred embodiment of this subject, the mixture of the epoxy resins is made up of
a) 30 to 45 wt % of an epoxy group-containing reaction product of epichlorohydrin with polypropylene glycol which has an epoxy equivalent weight of at least 250 g/eq,
b) 30 to 45 wt % of an epoxy group-containing reaction product of epichlorohydrin with a novolac resin which has an epoxy equivalent weight of at least 175 g/eq, and
c) 10 to 40 wt % of an epoxy group-containing reaction product of epichlorohydrin with at least one bisphenol which has an epoxy equivalent weight of at least 500 g/eq, the quantities of constituents a), b), and c) adding up to 100 wt %.

As a further constituent essential to the invention, the preparations contain at least one latent hardener.

A hardener is referred to as "latent" if it reacts only when a corresponding quantity of activation energy is delivered. It has proven advantageous according to the present invention if the activation energy is delivered in the form of heat, i.e. the latent hardener is activated by preference only above a temperature considerably higher than room temperature, for example above 80° C. or above 100° C., and only then reacts with the epoxy groups. In a preferred embodiment, the adhesive is therefore a one-component adhesive that hardens at a temperature in the range from 80 to 230° C., in particular from 100 to 200° C. This temperature is to be maintained by preference for a time period in the range from 5 to 150 minutes.

Such latent hardeners for epoxy resins are known to one skilled in the art. They can be selected, for example, from the following compounds: guanidines, substituted guanidines, substituted ureas, melamine resins, guanamine derivatives, cyclic tertiary amines, aromatic amines, and/or mixtures thereof. A latent hardener particularly preferred according to the present invention is dicyanamide.

The hardeners can be incorporated stoichiometrically into the hardening reaction, but also can be catalytically active.

Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine, and very particularly cyanoguanidine (dicyandiamide). Representatives of suitable guanamine derivatives that may be recited are alkylated benzoguanamine resins, benzoguanamine resins, or methoxymethylethoxymethylbenzoguanamine.

Catalytically active substituted ureas can furthermore be used as latent hardeners. These are, in particular, p-chlorophenyl-N,N-dimethylurea (monuron), 3-phenyl-1,1-dimethylurea (fenuron), or 3,4-dichlorophenyl-N,N-dimethylurea (diuron). In principle, catalytically active tertiary acrylamines or alkylamines such as, for example, benzyldimethylamine, tris(dimethylamino)phenol, piperidine, or piperidine derivatives can also be used. In addition, a variety of (by preference, solid) imidazole derivatives can be used as catalytically active accelerators. Representatives that may be named are 2-ethyl-2-methylimidazole, N-butylimidazole, benzimidazole, as well as N—$C_1$ to $C_{12}$-alkylimidazoles or N-arylimidazoles. Adducts of amino compounds with epoxy resins are also suitable as accelerating additives to the aforesaid hardeners. Suitable amino compounds are tertiary aliphatic, aromatic, or cyclic amines. Suitable epoxy compounds are, for example, polyepoxides based on glycidyl ethers of bisphenol A or F or of resorcinol. Concrete examples of such adducts are adducts of tertiary amines such as 2-dimethylaminoethanol, N-substituted piperazines, N-substituted homopiperazines, N-substituted aminophenols, with di- or polyglycidyl ethers of bisphenol A or F or of resorcinol.

It is particularly preferred if a combination of substituted guanidine and catalytically active substituted urea is used as a latent hardener; a combination of dicyandiamide with substituted urea is particularly preferred.

A preferred embodiment of a one-component adhesive is characterized in that it contains, based on the mass of the total adhesive, 50 to 99 wt % of a hardenable mixture of epoxy resins as described above, and 1 to 20 wt %, in particular 3 to 12 wt %, of one or more latent hardeners for epoxy resins, such that a remainder to make 100 wt % can be made up of hardening catalysts (such as, for example, substituted urea), fillers, stabilizers, color pigments, toughness improvers, and/or further adjuvants or active substances.

If a blowing agent (also called a "foaming agent") is additionally added to the thermally hardenable composition described above, what is obtained is an expandable and hardenable preparation that can serve as a structural foam for reinforcing components, in particular hollow components. It can be utilized for the reinforcement of components in vehicle construction, in particular in automotive construction. A further embodiment of the present invention therefore consists in the fact that the preparation additionally contains a physical or chemical blowing agent.

All known blowing agents are suitable in principle as a blowing agent, for example the "chemical blowing agents" that release gases by decomposition, or "physical blowing agents," i.e. expanding hollow spheres.

It has proven advantageous according to the present invention if the compositions contain 0.1 to 12 wt % of a blowing agent.

Examples of the former blowing agents are azobisisobutyronitrile, azodicarbonamide, dinitrosopentamethylenetetramine, 4,4'-oxybis(benzenesulfonic acid hydrazide), diphenylsulfone-3,3'-disulfohydrazide, benzene-1,3-disulfohydrazide, p-toluenesulfonyl semicarbazide.

The expandable hollow plastic microspheres based on polyvinylidene chloride copolymers or acrylonitrile-(meth) acrylate copolymers are particularly preferred. These are commercially obtainable, for example, under the names "Dualite®" resp. "Expancel®" from the Pierce & Stevens resp. Casco Nobel companies.

The quantity of blowing agent is preferably selected so that the volume of compound irreversibly increases, upon heating to activation temperature (or expansion temperature), by at least 10%, by preference at least 20%, and in particular at least 50%. This is to be understood to mean that upon heating to activation temperature the substance, in addition to the normal reversible thermal expansion in accordance with its coefficient of thermal expansion, irreversibly increases its volume, as compared with the initial volume at room temperature (22° C.), in such a way that after being cooled back to room temperature it is larger (to the extent recited) than before. The expansion factor indicated thus refers to the volume of the substance at room temperature before and after temporary heating to activation temperature. The upper limit of the expansion factor can be set by selecting the quantity of blowing agent in such a way that it is up to 300%, and in particular is less than 200%.

In this embodiment, the thermally foamable and hardenable composition by preference contains, based on the entire composition:

76 to 98.9 wt %, in particular 89 to 96 wt % of the hardenable mixture according to the present invention of epoxy resins,
1 to 12 wt %, in particular 3 to 7 wt % latent hardener, and
0.1 to 12 wt %, in particular 1 to 4 wt % blowing agent,
such that a remainder to make 100 wt % can be made up of hardening catalysts, fillers, stabilizers, color pigments, toughness improvers, and/or further adjuvants or active substances.

The activation temperature is by preference in the range from 100 to 220° C., in particular 120 to 200° C. This temperature is by preference to be maintained for a time period in the range from 5 to 150 minutes.

This thermally hardenable and foamable composition can be used as structural foam, this constituting a further embodiment of the invention. It can be used to reinforce and/or seal cavities, in particular cavities in metallic structures. It can be utilized for this purpose, for example, in shipbuilding, aircraft construction, and in particular in vehicle construction.

In order to improve fracture behavior, in particular at temperatures below 0° C., the preparations according to the present invention can contain one or more different so-called toughness improvers or "tougheners." Such tougheners are known to one skilled in the art of epoxy adhesives. They can be selected, for example, from: thermoplastic isocyanates or polyurethanes, rubber particles, in particular those having a core-shell structure, and block copolymers, in particular those that contain a first polymer block having a glass transition temperature below 15° C. and a second polymer block having a glass transition temperature above 25° C. Such block copolymers are by preference selected from those in which a first polymer block is selected from a polybutadiene or polyisoprene block, and a second polymer block is selected from a polystyrene or polymethyl methacrylate block. Specific examples thereof are block copolymers having the following block structure: styrene/butadiene/(meth)acrylate, styrene/butadiene/(meth)acrylic acid ester, ethylene/(meth)acrylic acid ester/glycidyl (meth)acrylic acid ester, ethylene/(meth) acrylic acid ester/maleic acid anhydride, methyl methacrylate/butyl acrylate/methyl methacrylate.

It has furthermore proven advantageous according to the present invention if the composition according to the present invention contains, besides the mixture of epoxy resins and the latent hardener, at least one inorganic and/or organic filler..

Fillers preferred according to the present invention are, for example, the various ground or precipitated chalks, carbon black, calcium-magnesium carbonates, talc, barite, and in particular silicate fillers of the aluminum-magnesium-calcium silicate type, for example wollastonite, chlorite.

For weight reduction, the preparation can also contain, in addition to the aforesaid "normal" fillers, so-called lightweight fillers. These can be selected from the group of the hollow metal spheres such as, for example, hollow steel spheres, hollow glass spheres, fly ash (fillite), hollow plastic spheres based on phenol resins, epoxy resins, or polyesters, expanded hollow microspheres having a wall material made of (meth)acrylic acid ester copolymers, polystyrene, styrene/(meth)acrylate copolymers, and in particular of polyvinylidene chloride as well as copolymers of vinylidene chloride with acrylonitrile and/or (meth)acrylic acid esters, ceramic hollow spheres, or organic lightweight fillers of natural origin such as ground nut shells, for example the shells of cashew nuts, coconuts, or peanuts, as well as cork flour or coke powder. Particularly preferred in this context are those lightweight fillers, based on hollow microspheres, that ensure high compressive strength in the cured preparation.

In addition, the hardenable preparations according to the present invention can contain further usual adjuvants and additives such as, for example, plasticizers, rheology adjuvants, wetting agents, adhesion promoters, aging protection agents, stabilizers, and/or color pigments.

The one-component adhesives according to the present invention can be used for joining and repairing parts in shipbuilding, aircraft construction, and vehicle construction. They are notable for good processability and high strength on the one hand, and particularly low health risk on the other. Further areas of application for the systems according to the present invention are the do-it-yourself sector, as well as the maintenance, repair, and overhaul sector for vehicles, machines, and aviation, but areas of application in other sectors of general industry are also encompassed according to the present invention.

A second subject of the present invention is therefore the use of the heat-curable compositions as a structural adhesive in vehicle construction, aircraft construction, or rail vehicle construction. They are notable in this context especially for impact resistance and high strength.

A third subject of the present invention is the use of the compositions according to the present invention, which additionally contain a blowing gas, as a structural foam for forming internal stiffeners of cavities, by preference in vehicle construction, and for the manufacture of stiffening coatings for thin-walled metal sheets or plastic components.

A further subject of the present invention is the use of the compositions according to the present invention for the manufacture of composite materials, as encapsulation compounds in the electrical resp. electronics industry, and as a die-attach adhesive in the manufacture of circuit boards in the electronics industry.

A further subject of the present invention is a method for adhesively bonding metallic and/or composite materials, in which method (a) in a first step, the surfaces of the parts to be bonded are optionally cleaned and/or pretreated, (b) in a second step, the one-component composition is applied onto at least one of the substrate surfaces to be joined, (c) the components are then joined, (d) the composition is optionally pre-gelled to the point of dimensional stability, and (e) lastly, the bond is cured by heating the components to temperatures between 80° C. and 210° C., by preference between 120° C. and 180° C.

A method for adhesively bonding metallic and/or composite materials, in which method (a) in a first step, the surfaces of the parts to be bonded are optionally cleaned and/or pretreated, (b) in a second step, the one-component composition is applied onto at least one of the substrate surfaces to be joined, (c) the components are then joined, and (d) lastly, the bond is cured by heating the components to temperatures between 80° C. and 210° C., by preference between 120° C. and 180° C.

"Pre-gelling to the point of dimensional stability" is understood as a controlled heating of the composition sufficiently to convert the optionally liquid composition into a state in which it can be stored for a longer period of time with no change in external geometry, but without permitting complete hardening of the epoxy resin mixture. To achieve this state, the heating is accurately monitored and limited in terms of the temperatures and utilization times used.

The one-component compositions according to the present invention are sold according to the present invention by preference in cartridges, drums, or large containers.

Exemplifying Embodiments

1 Manufacturing the Adhesives 1.1 Manufacturing the Resin Mixtures

The following resin mixtures were manufactured by mixing the individual components and vigorously stirring at 70 to 100° C. for 1 hour.

1.1.1 Measuring Viscosities

The viscosities were measured on an ARES instrument of TA Instruments, New Castle, Del. 19720, USA at a temperature of 25° C., and evaluated using TA-Orchestrator software. At a viscosity <0.25 Pa*s, measurement was performed using a cone and plate (0.04°/25 mm) at a shear rate of 0 to 100/s. Viscosities >0.25 Pa*s and <10,000 Pa*s were measured using parallel plates (25 mm/25 mm) at a shear rate of 0 to 100/s. Viscosities >10,000 Pa*s were measured using parallel plates (25 mm/25 mm) and at an angular frequency of 100 rad/s.

1.1.2 Compositions of the Resin Mixtures

|  | Resin mixture A | Resin mixture B |
| --- | --- | --- |
| DER ® 732 (g) | 33.3 | 40 |
| DEN ® 439 (g) | 66.7 | 40 |
| Epikote ® 1002 (g) | 0 | 20 |
| Parameters |  |  |
| Viscosity (Pa*s) | 60 | 80 |
| EEW* (g/eq) | 229 | 281 |

The EEW* value indicated in the last row was calculated from the weighted EEW values of the individual components.

1.2 Composition of the Adhesives

The following adhesive compositions were manufactured:

| Item | Raw material | Formula 1 | Formula 2 | Formula 3 | Formula 4 |
|---|---|---|---|---|---|
| 1 | Resin A | 67.06 g | — | 67.12 g | — |
| 2 | Resin B | — | 67.65 g | — | 67.59 g |
| 3 | Mesamoll® | — | 1.61 g | 1.59 g | — |
| 4 | Cardolite Lite® 2513 HP | 1.59 g | — | — | 1.61 g |
| 5 | Dyhard® 100SH | 5.95 g | 5.06 g | 5.87 g | 5.14 g |
| 6 | Dyhard® URAcc 13 | 0.30 g | 0.30 g | 0.30 g | 0.31 g |
| 7 | Aspolit® F70 | 22.07 g | 22.3 g | 22.1 g | 22.29 g |
| 8 | Cabosil® TS-720 | 3.03 g | 3.08 g | 3.02 g | 3.06 g |
|  | Epoxy equivalent | 0.3 | 0.2 | 0.3 | 0.2 |
|  | Amine equivalent | 0.3 | 0.2 | 0.3 | 0.2 |

In a first step, components 1 to 4 were placed into a Speedmixer and mixed for 20 seconds at 3500 rpm. Components 5 and 6 were then added, and a mixing operation was performed again for 20 seconds at 3500 rpm. Lastly, components 6 and 7 were also added. After further mixing under the conditions described, the resulting mixture was degassed under vacuum. The maximum heating occurring in the Speedmixer, depending on model, was 50° C.

1.3 List of Raw Materials Used

Aspolit® F70 Two-component filler made up of muscovite and quartz (approx. 69 wt % $SiO_2$, 14 wt % $Al_2O_3$, 5.5 wt % $K_2O$, 2 wt % CaO, 2 wt % $Fe_2O_3$ (Aspanger)

Cabosil® TS-720 Silicon dioxide, pyrogenic amorphous silicic acid; manufacturer: Cabot Cardolite Lite® 2513 HP Epoxidized cashew shell oil; approx. 99% pure; EEW 400 g/eq (Cardolite Europe)

DEN® 439 Reaction product of epichlorohydrin with a phenol/formaldehyde novolac; EEW 200 g/eq; epoxy functionality±3.8; manufacturer: Dow DER® 732 Reaction product of epichlorohydrin with polypropylene glycol; EEW 320 g/eq; manufacturer: Dow Dyhard® 100SH 1-Cyanoguanidine; approx. 94.8% pure (Evonik Degussa); AHEW 21 g/eq Dyhard® URAcc 13 Accelerator preparation based on a substituted urea; contains highly dispersed amorphous silicon dioxide (AlzChem)

Epikote® 1002 Reaction product of epichlorohydrin with bisphenol A; EEW 638 g/eq; manufacturer: Hexion Mesamoll® $C_{10-21}$ alkylsulfonic acid phenyl ester (Lanxess)

2 Determining Tensile Strengths

To determine tensile strength values, the adhesives were applied onto two sandblasted, cold-rolled steel specimens with an overlap area of 2.5 $cm^2$ and a layer thickness of 0.2 mm, and the two samples were bonded to one another. The samples were then cured for 30 minutes at 180° C. and then stored at room temperature for one day.

After that time, the tensile shear strength of the adhesive was tested in accordance with DIN EN 1465 at a rate of 15 mm/min.

The following values were obtained:

|  | LSS (N/$mm^2$) | Hazardous material labeling requirement per EC Guideline 67/548/EEC |
|---|---|---|
| Formula 1 | 30 | none |
| Formula 2 | 35 | none |
| Formula 3 | 30 | none |
| Formula 4 | 34 | none |

The adhesives according to the present invention, having no labeling requirement, exhibit tensile shear strength values that are in fact higher than the values that can be obtained with usual commercial products in this sector.

The invention claimed is:

1. A one-component heat-curable composition comprising:
   a mixture of epoxy resins and at least one latent hardener having an activation temperature above 80° C., such that the one-component heat-curable composition only undergoes curing when the latent hardener has been activated;
   wherein the mixture of epoxy resins comprises:
   a) 10 to 60 wt % of an epoxy group-containing reaction product of epichlorohydrin with polypropylene glycol that has an epoxy equivalent weight of at least 250 g/eq;
   b) 15 to 85 wt % of an epoxy group-containing reaction product of epichlorohydrin with a novolac resin that has an epoxy equivalent weight of at least 175 g/eq and an epoxy functionality of at least 3, and wherein the novolac resin is a polycondensation product of formaldehyde with phenol and/or cresol; and
   c) 0 to 70 wt % of an epoxy group-containing reaction product of epichlorohydrin with at least one bisphenol, which has an epoxy equivalent weight of at least 500 g/eq;
   wherein the wt % is based on the mass of all epoxy resins.

2. The composition according to claim 1, wherein component a) has an epoxy equivalent weight of at least 300 g/eq; or
   wherein component b) has an epoxy equivalent weight of at least 190 g/eq.

3. The composition according to claim 1, wherein the composition further contains at least one inorganic and/or organic filler.

4. The composition according to claim 1, wherein the at least one latent hardener comprises dicyandiamide.

5. A vehicle, aircraft, or rail vehicle constructed with a structural adhesive, wherein the structural adhesive comprises the composition according to claim 1.

6. An encapsulation compound or adhesive for use in the electrical or electronics industry, wherein the encapsulating compound or adhesive comprises the composition according to claim 1.

7. A method for adhesively bonding metallic and/or composite materials, comprising the steps of:
   (a) first, optionally cleaning and/or pretreating the surfaces of the materials to be bonded,
   (b) second, applying the one-component heat-curable composition according to claim 1 onto at least one of the surfaces of the materials to be bonded,
   (c) joining the surfaces of the materials to be bonded,
   (d) optionally, pre-gelling the one-component heat-curable composition to the point of dimensional stability, and
   (e) lastly, curing the one-component heat-curable composition by heating the joined materials to temperatures between 80° C. and 210° C.

8. A one-component heat-curable composition comprising:
   a mixture of epoxy resins, a blowing agent, and at least one latent hardener having an activation temperature above 80° C., such that the one-component heat-curable composition only undergoes curing when the latent hardener has been activated;

wherein the mixture of epoxy resins comprises:
a) 10 to 60 wt % of an epoxy group-containing reaction product of epichlorohydrin with polypropylene glycol that has an epoxy equivalent weight of at least 250 g/eq;
b) 15 to 85 wt % of an epoxy group-containing reaction product of epichlorohydrin with a novolac resin that has an epoxy equivalent weight of at least 175 g/eq and an epoxy functionality of at least 3, and wherein the novolac resin is a polycondensation product of formaldehyde with phenol and/or cresol; and
c) 0 to 70 wt % of an epoxy group-containing reaction product of epichlorohydrin with at least one bisphenol, which has an epoxy equivalent weight of at least 500 g/eq;
wherein the wt % is based on the mass of all epoxy resins.

9. A structural foam for forming internal stiffeners of cavities and for the manufacture of stiffening coatings for thin-walled metal sheets or plastic components, wherein the structural foam comprises the composition according to claim 8.

10. The composition according to claim 8, wherein the mixture of epoxy resins comprises:
a) 30 to 45 wt % of the epoxy group-containing reaction product of epichlorohydrin with polypropylene glycol;
b) 15 to 85 wt % of the epoxy group-containing reaction product of epichlorohydrin with a novolac resin; and
c) 10 to 40 wt % of the epoxy group-containing reaction product of epichlorohydrin with at least one bisphenol;
wherein the wt % is based on the mass of all epoxy resins.

* * * * *